March 12, 1929.   G. ALBERT   1,705,387
AIRPLANE
Filed June 1, 1928   2 Sheets-Sheet 1
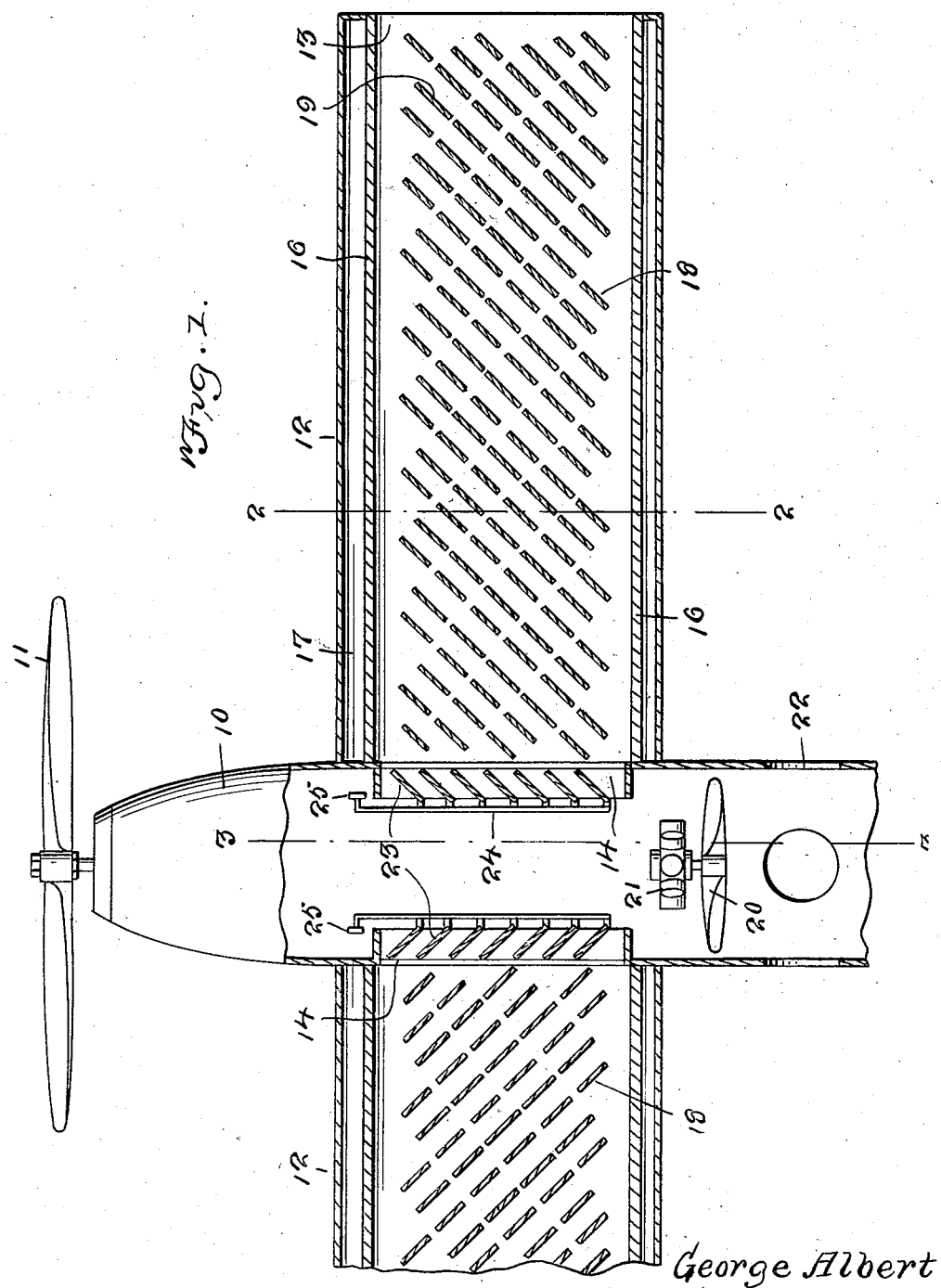
George Albert
INVENTOR
BY Victor J. Evans
ATTORNEY

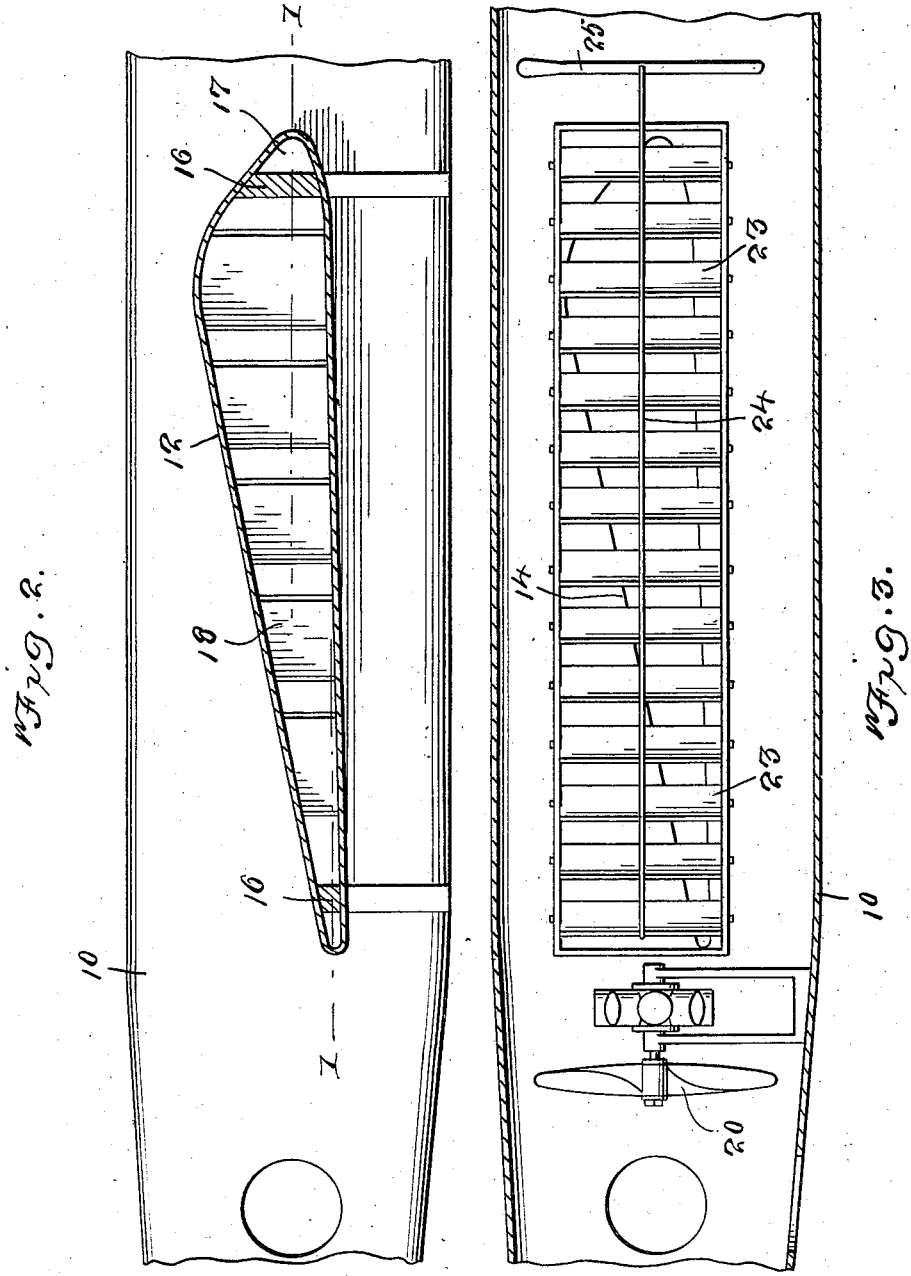

Patented Mar. 12, 1929.

1,705,387

UNITED STATES PATENT OFFICE.

GEORGE ALBERT, OF PRESCOTT, ARIZONA.

AIRPLANE.

Application filed June 1, 1928. Serial No. 282,170.

This invention relates to improvements in airplanes, hydroplanes, and similar vehicles, the invention particularly relating to a wing structure and means to create a current of air therethrough.

An object of the present invention is to provide means for creating an auxiliary traction means for use in conjunction with the usual traction propeller or propellers, to assist in forward flight; aid in making turns, as well as to increase the stability of the wing structure, and in addition, overcome to a great extent side slipping, and cause the airplane or other vehicle to operate in a much steadier manner.

With the above and other objects in view, the invention further includes the following novel features and details of construction, to be hereinafter more fully described, illustrated in the accompanying drawings and pointed out in the appended claims.

In the drawings:—

Figure 1 is a fragmentary sectional view showing an airplane equipped with the invention, the section being taken substantially on the line 1—1 of Figure 2.

Figures 2 and 3 are enlarged sectional views taken substantially on the lines 2—2 and 3—3 of Figure 1.

Referring to the drawings in detail wherein like characters of reference denote corresponding parts, the reference character 10 indicates a portion of the body or fuselage of an airplane to which the invention is shown as applied, the traction propeller of the plane being indicated at 11. While only one traction propeller is shown, this is unimportant as more than one propeller may be used.

The airplane which may be of the monoplane or biplane type has extending from opposite sides of its fuselage a wing 12. These wings are hollow, and shaped after the approved manner of airplane wings, but are open at their outer and inner ends so as to provide air passages 13 whose inner ends communicate with the interior of the fuselage as shown at 14. The wings are provided with longitudinally extending partitions 16, and a space 17 at the leading edges of these wings, may if desired be utilized for accommodating fuel storage tanks.

Arranged within the air passages 13 of the wings are spaced vertically disposed vanes 18. These vanes are arranged in spaced diagonal rows, so that when the airplane is in flight, air drawn into the wings at their outer ends will strike the rear inclined faces 19 of these vanes so as to cause a forward thrust upon these rear inclined faces and a partial vacuum upon their opposite faces and will thus aid materially in the forward movement of the plane.

Located within the fuselage immediately behind the line of the rear edge of the wings is a suction fan 20 which may be driven by a suitable motor 21, while at the rear of this fan the fuselage is provided with air escape openings 22. Operation of the fan 20 will thus cause a strong current of air to be drawn inward through the wings so as to act upon the vanes in the manner described. Instead of providing a suction through the wings, the same effect could be obtained by means of a forced draft through the wings.

Located at the junctures of the wings and body or fuselage are spaced vertically disposed pivotally mounted shutters 23. These shutters have a pivotal connection with rods 24 which are controlled by pivotally mounted levers 25. By operating the levers 25, the pivotal position of the shutters 23 may be regulated so as to more or less interrupt or establish communication between the wings and fuselage and thereby regulate the current of air passing through the wings. The adjustment of these shutters and the regulation of the air currents thereby which pass through the wings will materially aid in handling and controlling the airplane.

For example, assuming that the flight is at an angle to the direction of wind currents. By partly closing the shutters on one wing to reduce the passage of air therethrough, and properly adjusting the shutters of the opposite wing, most of the side slipping of the airplane will be eliminated. These shutters will also assist in making turns and in guiding the plane. In making a left turn, the shutters for the left wing would be partly closed so that a greater suction of air would occur through the right wing. This would create a greater drawing or tractive energy through the right wing than through the left wing, so that the plane can be turned with a lesser bank.

Also by creating a suction through the wings, the action of air at the ends of the wings will act as guides for the air trail through the plane is travelling and will cause the plane to operate in a much steadier manner than otherwise. With this wing structure, cruising speed may be materially increased, while landing speed will be decreased.

In addition to the advantages stated, the vanes 18 will materially strengthen the wings, while the wing structure will not interfere with the operation of the plane in the usual manner and with the usual traction propellers alone, as the airplane may be equipped with all of the elements and devices common to airplane construction.

The invention is susceptible of various changes in its form, proportions and minor details of construction and the right is herein reserved to make such changes as properly fall within the scope of the appended claims.

Having described the invention what is claimed is:

1. In combination with a body having traction means, hollow wings extending from opposite sides of the body, said wings being open at their outer ends and communicating with the interior of the body at their inner ends, means to create an air current through the wings and body, and means acted upon by the air currents passing through the wings to provide auxiliary traction means.

2. In combination with a body having traction means, hollow wings extending from opposite sides of the body, said wings being open at their outer ends and communicating with the interior of the body at their inner ends, means to create an air current through the wings and body, means acted upon by the air currents passing through the wings to provide auxiliary traction means, and means to control the auxiliary traction means.

3. In combination with a body having traction means, hollow wings extending from opposite sides of the body, said wings being open at their outer ends and communicating with the interior of the body at their inner ends, means to create an air current through the wings and body, means acted upon by the air currents passing through the wings to provide auxiliary traction means, and means whereby the auxiliary traction means may be operated to assist in controlling the direction of travel of said body.

4. In combination with a body having traction means, hollow wings extending from opposite sides of the body, said wings being open at their outer ends and communicating with the interior of the body at their inner ends, means to create an air current through the wings and body, and spaced vertically disposed vanes located in the wings to be acted upon by the air currents passing through said wings to provide auxiliary traction means.

5. In combination with a body having traction means, hollow wings extending from opposite sides of the body, said wings being open at their outer ends and communicating with the interior of the body at their inner ends, means to create an air current through the wings and body, means acted upon by the air currents passing through the wings to provide auxiliary traction means, and shutters located at the points of communication between the wings and body to control the auxiliary traction means.

6. In combintion with a body having traction means, hollow wings extending from opposite sides of the body, said wings being open at their outer ends and communicating with the interior of the body at their inner ends, means to create an air current through the wings and body, and spaced vertically disposed vanes located in the wings and arranged at an angle to the line of travel to be acted upon by the air currents passing through the wings to provide auxiliary traction means.

7. In combination with a body having traction means, hollow wings extending from opposite sides of the body, said wings being open at their outer ends and communicating with the interior of the body at their inner ends, means located within the body adjacent the wings to create an air current through the wings and body, and means acted upon by said air current to provide auxiliary traction means.

In testimony whereof I affix my signature.

GEORGE ALBERT.